United States Patent [19]

Lin

[11] Patent Number: 5,414,827
[45] Date of Patent: May 9, 1995

[54] AUTOMATIC CACHE FLUSH

[75] Inventor: Fong-Lu Lin, San Jose, Calif.

[73] Assignee: OPTi, Inc., Santa Clara, Calif.

[21] Appl. No.: 812,074

[22] Filed: Dec. 19, 1991

[51] Int. Cl.$^6$ .......................................... G06F 12/12
[52] U.S. Cl. .................. 395/425; 364/243.5; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,426,682 | 1/1984 | Rife et al. | 364/200 |
| 4,493,026 | 1/1985 | Olnowich | 364/200 |
| 4,713,755 | 12/1987 | Worley, Jr. et al. | 364/200 |
| 4,794,523 | 12/1988 | Adan et al. | 364/200 |
| 4,831,520 | 5/1989 | Rubinfeld et al. | 364/200 |
| 4,831,581 | 5/1989 | Rubinfeld | 364/200 |
| 4,833,599 | 5/1989 | Colwell et al. | 364/200 |
| 4,847,758 | 7/1989 | Olson et al. | 364/200 |
| 4,920,477 | 4/1990 | Colwell et al. | 364/200 |
| 4,953,073 | 8/1990 | Moussouris et al. | 364/200 |
| 4,959,777 | 9/1990 | Holman, Jr. | 364/200 |
| 5,008,813 | 4/1991 | Crane et al. | 364/200 |
| 5,045,998 | 9/1991 | Begun et al. | 364/200 |
| 5,057,837 | 10/1991 | Colwell et al. | 341/55 |
| 5,091,845 | 2/1992 | Rubinfeld | 395/425 |
| 5,091,846 | 2/1992 | Sachs et al. | 395/250 |
| 5,091,850 | 2/1992 | Culley | 395/450 |
| 5,095,428 | 3/1992 | Walker et al. | 395/425 |
| 5,097,532 | 3/1992 | Borup et al. | 395/425 |
| 5,113,506 | 5/1992 | Moussouris et al. | 395/400 |
| 5,119,485 | 6/1992 | Ledbetter et al. | 395/425 |
| 5,157,774 | 10/1992 | Culley | 395/425 |
| 5,210,850 | 5/1993 | Kelly et al. | 395/425 |
| 5,247,648 | 9/1993 | Watkins et al. | 395/425 |
| 5,276,833 | 1/1994 | Auvinen et al. | 395/425 |
| 5,293,603 | 3/1994 | MacWilliams et al. | 395/425 |

OTHER PUBLICATIONS

Buchanan, "A Highly Integrated VLSI Chip Set for EISA System Design", Silicon Valley Personal Computer Design Conference Proceedings, Jul. 9–10, 1991, pp. 293–306.
MicroDesign Resources, Inc., "PC Chip Sets" (1992), Chap. 4.
Intel Corp., 8235ODT EISA Chip Set (Sep. 1991).
Intel Corp., 82350 EISA Chip Set, Peripheral Components, Data Book (Jul. 1990).
Intel Corp., i486 Processor Hardware Reference Manual (1990), pp. 6-1 through 6-39.
Texas Instruments Corp., TACT84500 EISA Chip Set, Preview Bulletin (1991).
OPTi, Inc., OPTi-386WB PC/AT Chipset (82C391/82C392/82C206), Data Book, Version 1.2 (Mar. 28, 1991).
Cypress Semiconductor Corp., CMOS BiCMOS Data Book (Mar. 1, 1991), pp. 2–297 through 2–315 (CY7B180/CY7B181).
OPTi, Inc., "HiD/386 at Chipset High Integration Direct Mapped Cache at 82C381/82C382D-25/33" (1989) (With Schematic).

*Primary Examiner*—Reba I. Elmore
*Attorney, Agent, or Firm*—Fliesler, Dubb, Meyer & Lovejoy

[57] ABSTRACT

According to the invention, a chipset is provided which powers up in a default state with caching disabled and which writes permanently non-cacheable tags into tag RAM entries corresponding to memory addresses being read while caching is disabled. Even though no "valid" bit is cleared, erroneous cache hits after caching is enabled are automatically prevented since any address which does match a tag in the tag RAM, is a non-cacheable address and will force retrieval directly from main memory anyway.

16 Claims, 10 Drawing Sheets

CONTROL REGISTER 1
INDEX: 20h

FIG. 2

| BIT | FUNCTION | FAULT |
|---|---|---|
| 7-6 | REVISION OF 82C391 AND IS READ-ONLY | 0 0 |
| 3 | SINGLE ALE ENABLE-SYSC WILL ACTIVATE SINGLE ALE INSTEAD OF MULTIPLE ALEs DURING BUS CONVERSION CYCLE IF THIS BIT IS ENABLED.<br>0=DISABLE 1=ENABLE | 0 |
| 2 | EXTRA AT CYCLE WAIT STATE ENABLE. INSERT ONE EXTRA WAIT STATE IN STANDARD AT BUS CYCLE. 0=DISABLE 1=ENABLE | 0 |
| 1 | KEYBOARD AND FAST RESET CONTROL-TURN ON THIS BIT REQUIRES "HALT" INSTRUCTION TO BE EXECUTED BEFORE SYSC GENERATES CPURST..FROM KEYBOARD RESET<br>0=DISABLE 1=ENABLE | 0 |
| 0 | FAST RESET ENABLE-ALTERNATIVE FAST CPU RESET.<br>0=DISABLE 1=ENABLE | 0 |

CONTROL REGISTER 2
INDEX: 21h

FIG. 3

| BIT | FUNCTION | DEFAULT |
|---|---|---|
| 7 | MASTER MODE BYTE SWAP ENABLE<br>0=DISABLE 1=ENABLE | 0 |
| 6 | FAST KEYBOARD RESET DELAY CONTROL<br>0=GENERATE RESSET PULSE 2 US LATER<br>1=GENERATE RESET PULSE IMMEDIATELY | 0 |
| 5 | PARITY CHECK<br>0=DISABLE 1=ENABLE | 0 |
| 4 | CACHE ENABLE<br>0=DISABLE 1=ENABLE | 0 |
| 3-2 | CACHE SIZE<br>3 2 CACHE SIZE<br>0 0 32KB<br>0 1 64KB<br>1 0 128KB<br>1 1 256KB | 00 |
| 1-0 | CACHE WRITE CONTROL<br>1 0 WRITE CONTROL<br>0 0=1 WAIT STATE, WRITE HIT CYCLE<br>0 1=0 WAIT STATE FOR 32KX8 SRAMs WHICH MAKES 128K OR 256K CACHE<br>1 0=NOT USED<br>1 1=0 WAIT STATE FOR 8KX8 SRAMs WHICH MAKES 32K OR 64K CHACHE<br>NOTICE CHACHE READ ALWAYS 0 WAIT STATE | 00 |

SHADOW RAM CONTROL REGISTER I
INDEX: 22h

FIG. 4

| BIT | FUNCTION | DEFAULT |
|---|---|---|
| 7 | ROM ENABLE AT F0000–FFFFF<br>1=READ FROM ROM, WRITE TO DRAM.<br>0=READ FROM DRAM AND DRAM IS WRITE-PROTECTED | 1 |
| 6 | SHADOW RAM AT D0000h–DFFFFh AREA<br>00=DISABLE 1=ENABLE | 0 |
| 5 | SHADOW RAM AT E0000h–EFFFFh AREA<br>0=DISABLE SHADOW, ENABLE ROMCS#<br>1=ENABLE SHADOW, DISABLE ROMCS# | 0 |
| 4 | SHADOW RAM AT D0000h–DFFFFh AREA WRITE PROTECT ENABLE<br>0=DISABLE 1=ENABLE | 0 |
| 3 | SHADOW RAM AT E0000h–EFFFFh AREA WRITE PROTECT ENABLE<br>0=DISABLE 1=ENABLE | 0 |
| 2 | HIDDEN REFRESH-REFRESH ENABLE (WITHOUT HOLDING CPU)<br>1=DISABLE 0=ENABLE | 1 |
| 1 | UNUSED BIT | 0 |
| 0 | SLOW REFRESH ENABLE (4 TIMES SLOWER THAN THE NORMAL REFRESH)<br>0=DISABLE 1=ENABLE | 0 |

SHADOW RAM CONTROL REGISTER II
INDEX: 23h

FIG. 5

| BIT | FUNCTION | DEFAULT |
|---|---|---|
| 7 | SHADOW RAM AT EC000h–EFFFFh AREA<br>0=DISABLE 1=ENABLE | 0 |
| 6 | SHADOW RAM AT E8000h–EBFFFh AREA<br>0=DISABLE 1=ENABLE | 0 |
| 5 | SHADOW RAM AT E4000h–E7FFFh AREA<br>0=DISABLE 1=ENABLE | 0 |
| 4 | SHADOW RAM AT E0000h–E3FFFh AREA<br>0=DISABLE 1=ENABLE | 0 |
| 3 | SHADOW RAM AT DC000h–DFFFFh AREA<br>0=DISABLE 1=ENABLE | 0 |
| 2 | SHADOW RAM AT D8000h–DBFFFh AREA<br>0=DISABLE 1=ENABLE | 0 |
| 1 | SHADOW RAM AT D4000h–D7FFFh AREA<br>0=DISABLE 1=ENABLE | 0 |
| 0 | SHADOW RAM AT D0000h–D3FFFh AREA<br>0=DISABLE 1=ENABLE | 0 |

SHADOW RAM CONTROL REGISTER III
INDEX: 26h

| BIT | FUNCTION | DEFAULT |
|---|---|---|
| 6 | SHADOW RAM COPY ENABLE FOR ADDRESS AREA C0000h-EFFFFh<br>0=READ/WRITE at AT BUS<br>1=READ FROM AT BUS AND WRITE INTO SHADOW RAM | 0 |
| 5 | SHADOW WRITE PROTECT AT ADDRESS AREA C0000h-CFFFFh<br>0=WRITE PROTECT DISABLE<br>1=WRITE PROTECT ENABLE | 1 |
| 4 | SHADOW RAM ENABLE AT C0000h-CFFFFh AREA<br>0=DISABLE 1=ENABLE | 1 |
| 3 | ENABLE SHADOW RAM AT CC000h-CFFFF AREA<br>0=DISABLE 1=ENABLE | 0 |
| 2 | ENABLE SHADOW RAM AT C8000h-CBFFF AREA<br>0=DISABLE 1=ENABLE | 0 |
| 1 | ENABLE SHADOW RAM AT C4000h-C7FFFh AREA<br>0=DISABLE 1=ENABLE | 0 |
| 0 | ENABLE SHADOW RAM AT C0000h-C3FFFh AREA<br>0=DISABLE 1=ENABLE | 0 |

FIG. 6

DRAM CONTROL REGISTER I
INDEX: 24h

FIG. 7

| BIT | FUNCTION | DEFAULT |
|---|---|---|
| 7 | 2 BANK MODE. WHEN ENABLED, ONLY FIRST TWO BANKS(BANK 0 AND BANK 1) ARE USED. 1=DISABLE 0=ENABLE | 0 |
| 6-4 | DRAM TYPES USED FOR BANK0 AND BANK1. SEE THE FOLLOWINNG TABLE | 000 |
| 3 | NOT USED | 0 |
| 2-0 | DRAM TYPES USED FOR BANK 2 AND BANK 3. SEE THE FOLLOWING TABLE. BIT 2-0 ARE NOT USED WHEN BIT 7 IS SET TO "0". | 111 |

FIG. 7A

| BITS 7 6 5 4 | BANK 0 | BANK 1 |
|---|---|---|
| 1 0 0 0 | 1M | X |
| 1 0 0 1 | 1M | 1M |
| 1 0 1 0 | 1M | 4M |
| 1 0 1 1 | 4M | 1M |
| 1 1 0 0 | 4M | X |
| 1 1 0 1 | 4M | 4M |
| 1 1 1 X | X | X |
| 0 0 0 0 | 256K | X |
| 0 0 0 1 | 256K | 256K |
| 0 0 1 0 | 256K | 1M |

FIG. 7B

| BITS 7 2 1 0 | BANK 2 | BANK 3 |
|---|---|---|
| 1 0 0 0 | 1M | X |
| 1 0 0 1 | 1M | 1M |
| 1 0 1 0 | X | X |
| 1 0 1 1 | 4M | 1M |
| 1 1 0 0 | 4M | X |
| 1 1 0 1 | 4M | 4M |
| 1 1 1 X | X | X |

DRAM CONTROL REGISTER II
INDEX: 25h

| BIT | FUNCTION | DEFAULT |
|---|---|---|
| 7-6 | READ CYCLE WAIT STATE<br>7 6  ADDITIONAL WAIT STATES<br>0 0  NOT USED<br>0 1  0<br>1 0  1<br>1 1  2<br>NOTE: BASE WAIT STATES IS "3". | 11 |
| 5-3 | WRITE CYCLE WAIT STATE<br>5 4 3  ADDITIONAL WAIT STATES<br>0 0 0  0<br>0 1 0  1<br>1 0 0  2<br>1 1 0  3<br>0 0 1  NOT USED<br>NOTE: BASE WAIT STATE IS "2". | 110 |
| 2-0 | UNUSED | 00 |

FIG. 8

CONTROL REGISTER 3
INDEX: 27h

| BIT | FUNCTION | DEFAULT |
|---|---|---|
| 7 | ENABLE NON-CACHEABLE FUNCTION<br>1=ALL DRAM ARE NON-CACHEABLE<br>0=DRAM CACHEABLE RANGE CONTROLLED BY BIT 3-0 | 1 |
| 6-5 | UNUSED | 00 |
| 4 | VIDEO BIOS AT C0000h-C8000h AREA NON-CACHEABLE<br>0=CACHEABLE, 1=NON CACHEABLE | 1 |
| 3-0 | CACHEABLE ADDRESS RANGE FOR LOCAL MEMORY. | 0001 |

FIG. 9

| BITS<br>3 2 1 0 | CACHEABLE ADDRESS RANGE |
|---|---|
| 0 0 0 0 | 0-64Mb |
| 0 0 0 1 | 0-4Mb |
| 0 0 1 0 | 0-8Mb |
| 0 0 1 1 | 0-12Mb |
| 0 1 0 0 | 0-16Mb |
| 0 1 0 1 | 0-20Mb |
| 0 1 1 0 | 0-24Mb |
| 0 1 1 1 | 0-28Mb |
| 1 0 0 0 | 0-32Mb |
| 1 0 0 1 | 0-36Mb |
| 1 0 1 0 | 0-40Mb |
| 1 0 1 1 | 0-44Mb |
| 1 1 0 0 | 0-48Mb |
| 1 1 0 1 | 0-52Mb |
| 1 1 1 0 | 0-56Mb |
| 1 1 1 1 | 0-60Mb |

FIG. 9A

NON-CACHEABLE BLOCK 1 REGISTER I-
INDEX: 28h

| BIT | FUNCTION | DEFAULT |
|---|---|---|
| 7-5 | SIZE OF NON-CACHEABLE MEMORY BLOCK 1, SEE FOLLOWING TABLE | 100 |
| 4-2 | UNUSED | 000 |
| 1-0 | ADDRESS BITS OF A25 AND A24 OF NON-CACHEABLE MEMORY BLOCK 1 | 00 |

*FIG. 10A*

NON-CACHEABLE BLOCK 1 REGISTER II
INDEX: 29h

| BIT | FUNCTION | DEFAULT |
|---|---|---|
| 7-0 | ADDRESS BIT A23-A16 OF NON-CACHEABLE MEMORY BLOCK 1 | 0001xxxx |

*FIG. 10B*

| 7 6 5 | BLOCK SIZE |
|---|---|
| 0 0 0 | 64K |
| 0 0 1 | 128K |
| 0 1 0 | 256K |
| 0 1 1 | 512K |
| 1 X X | DISABLED |

*FIG. 10C*

| | VALID STARTING ADDRESS BITS | | | | | | | |
|---|---|---|---|---|---|---|---|---|
| BLOCK SIZE | A23 | A22 | A21 | A20 | A19 | A18 | A17 | A16 |
| 64K | V | V | V | V | V | V | V | V |
| 128K | V | V | V | V | V | V | V | X |
| 256K | V | V | V | V | V | V | X | X |
| 512K | V | V | V | V | V | X | X | X |

*FIG. 10D*

| 21h (3) | 21h (2) | CACHE SIZE | BITS USED TO ADDRESS TAG SRAM | TAG(7:3) | TAG(2) | TAG(1) | TAG(0) |
|---|---|---|---|---|---|---|---|
| 0 | 0 | 32KB | CA(14:4) | CA(22:18) | CA(17) | CA(16) | CA(15) |
| 0 | 1 | 64KB | CA(15:4) | CA(22:18) | CA(17) | CA(16) | CA(23) |
| 1 | 0 | 128KB | CA(16:4) | CA(22:18) | CA(17) | CA(24) | CA(23) |
| 1 | 1 | 256KB | CA(17:4) | CA(22:18) | CA(25) | CA(24) | CA(23) |

AUTOMATIC CACHE FLUSH

BACKGROUND

1. Field of the Invention

The invention relates to IBM PC AT-compatible computer architectures, and more particularly, to enhancements thereof for power-on cache flushing.

2. Description of Related Art

The IBM PC AT (Trademark of IBM Corp.) computer architecture is an industry standard architecture for personal computers and is typically built around a Central Processing Unit (CPU) such as an 80286, 80386SX, 80386DX, or 80486 microprocessor manufactured by Intel Corporation. The CPU is coupled to a local bus, capable of performing memory accesses and data transfers at high rates of speed (i.e., on the order of 10–50 MHz with today's technology). The local bus includes 16 or 32 data lines, a plurality of memory address lines, and various control lines.

The typical IBM PC AT-compatible platform also includes Dynamic Random Access Memory (DRAM) main memory, and in many cases a timer, a real-time clock, and a cache memory, all coupled to the local bus.

The typical IBM PC AT-compatible computer also includes an Input/Output (I/O) bus which is separate and distinct from the local bus. The I/O bus, sometimes referred to in these systems as an AT bus, an Industry Standard Architecture (ISA) bus or an Extended Industry Standard Architecture (EISA) bus, is coupled to the local bus via certain interface circuitry. The I/O bus includes 16 or 32 data lines, a plurality of I/O address lines, as well as control lines. The I/O address space is logically distinct from the memory address space and if the CPU desires to access an I/O address, it does so by executing a special I/O instruction. The interface circuitry recognizes the I/O signals thereby generated by the CPU, performs the desired operation over the I/O bus, and if appropriate, returns results to the CPU over the local bus.

In practice, some I/O addresses may reside physically on the local bus and some memory addresses may reside physically on the I/O bus. The interface circuitry is responsible for recognizing that a memory or I/O address access must be emulated by an access to the other bus, and is responsible for doing such emulation. For example, a Read Only Memory (ROM) (or Erasable Programmable ROM (EPROM)) Basic Input Output System (BIOS) may be physically on the I/O bus, but actually form part of the local memory address space. During system boot, when the CPU sends out a non-I/O address which is physically within the ROM BIOS, the interface circuitry recognizes such, enables a buffer which couples the address onto the I/O bus, and activates the chip select for the ROM. The interface circuitry then assembles a data word of the size expected by the CPU, from the data returned by the ROM, and couples the word onto the local bus for receipt by the CPU. In many systems, at some point during the ROM-based boot-up procedure, the ROM BIOS is copied into equivalent locations in the DRAM main memory and thereafter accessed directly. The portion of DRAM main memory which receives such portions of the BIOS is sometimes referred to as "shadow Random Access Memory (RAM)".

More specifically, in the standard PC AT architecture, the logical main memory address space is divided into a low memory range (0h–9FFFFh), a reserved memory range (A0000h–FFFFFh) and an extended memory range (100000h–FFFFFFh). In a typical system the system ROM BIOS is located logically at addresses F0000h–FFFFFh, and is located physically on the I/O bus. Additional system ROM BIOS may be located in expansion sockets at addresses E0000h–EFFFFh, physically located on the I/O bus. Addresses C0000h–EFFFFh contain ROM BIOS portions for specific add-on cards and are located physically on their respective cards on the I/O bus. Addresses A0000h–BFFFFh contain the video buffer, located physically on a video controller on the I/O bus. Duplicate memory space is typically provided in DRAM on the local bus for addresses C0000h–FFFFFh, and the user of the system can select which portions of the ROM BIOS are to be "shadowed" by being copied into the duplicate DRAM space during boot-up. Subsequent accesses to "shadowed" portions of the BIOS are to the DRAM copy, which is typically much faster than accesses to the ROM copy.

When an Intel 80×86 microprocessor first powers up, it begins by executing the instruction located 16 bytes from the highest memory address. For the 8086/8088, this address is FFFF0h. For the 80286, it is FFFFF0h, for the 80386 it is FFFFFFF0h, and for the 80486 it is FFFFFFF0h. Typical IBM PC AT-compatible systems have a jump instruction at this address, to the beginning of a power-on self-test (POST) routine in the system ROM BIOS. The POST tests the microprocessor, memory, and other hardware components for presence and reliability, and also initializes various interrupt vector table entries with default values pointing to handler routine within the system BIOS.

As part of its duties, the POST scans for add-on ROM BIOS modules beginning at every 2k byte increment from address C0000h to DFFFFh. At each increment, it checks for a signature of 55h at offset 0, and AAh at offset 1 to indicate a valid add-on ROM BIOS module. The byte at offset 2 then contains the length of the BIOS module (measured in 512 byte blocks), and offset 3 begins the executable code for the module. The POST performs a checksum on all the bytes in the module, which should always yield a value of 00h in each of the low order two bytes, and then executes a "far call" instruction to the offset 3 byte to permit the module to perform its own initialization. The module executes a "far return" instruction to return to the POST. The portion of the POST which checks for ROM BIOS modules is known as BIOS sizing.

The BIOS sizing operation in the POST also checks for an expansion system BIOS ROM in the range E0000h–EFFFFh. The POST checks for a valid signature at offsets 0 and 1 at each increment, performs a checksum verification for the modules it finds, and executes a far call to the offset 3 byte of the module to permit the module to perform its own initialization. An overall checksum verification is also perform on the main system BIOS range F0000h–FFFFFh.

The POST also checks the integrity of all the memory in the system from address 0h to 9FFFFh and 100000h to the top of memory by writing known data to these addresses and then reading it back. The POST also checks the integrity of whatever video memory is present in addresses A0000h–BFFFFh by the same or a similar method.

In addition to the above elements of a standard PC AT-compatible system, a keyboard controller typically is also coupled to the I/O bus, as is a video display controller. A typical IBM PC AT-compatible system may also include a Direct Memory Access (DMA) controller which permits peripheral devices on the I/O bus to read or write directly to or from main memory, as well as an interrupt controller for transmitting interrupts from various add-on cards to the CPU. The add-on cards are cards which may be plugged into slot connectors coupled to the I/O bus to increase the capabilities of the system.

General information on the various forms of IBM PC AT-compatible computers can be found in IBM, "PC/AT Technical Reference Manual" (1985); Sanchez, "IBM Microcomputers: A Programmer's Handbook" (McGraw-Hill: 1990) and Solari, "AT Bus Design" (San Diego: Annabooks, 1990). See also the various data books and data sheets published by Intel Corporation concerning the structure and use of the iAPX-86 family of microprocessors, including the "386 DX Microprocessor", data sheet, published by Intel Corporation (1990). All the above references are incorporated herein by reference.

Recently, efforts have been made to reduce the size and improve the manufacturability of PC AT-compatible computers. Specifically, efforts have been made to minimize the number of integrated circuit chips required to build such a computer. Several manufacturers have developed "PC AT chipsets", which integrate a large amount of the I/O interface circuitry and other circuitry onto only a few chips. An example of such a chipset is the 386WT PC/AT chipset manufactured by OPTi, Inc., Santa Clara, Calif., made up of the OPTi 82C381, 82C382 and 82C206.

Several of these chipsets, including the 386 WT chipset, implement a direct mapped cache memory to improve performance. The use of a small, high speed cache in a computer design permits the use of relatively slow but inexpensive DRAM for the large main memory space, by taking advantage of the "property of temporal locality," i.e., the property inherent in most computer programs wherein a memory location referenced at one point in time is very likely to be referenced again soon thereafter. Descriptions of the various uses of and methods of employing caches appear in the following articles: Kaplan, "Cache-based Computer Systems," *Computer*, 3/73 at 30-36; Rhodes, "Caches Keep Main Memories From Slowing Down Fast CPUs," *Electronic Design*, Jan. 21, 1982, at 179; Strecker, "Cache Memories for PDP-11 Family Computers," in Bell, "*Computer Engineering*" (Digital Press), at 263-67, all incorporated herein by reference.

In general, a direct mapped cache memory comprises a high speed data RAM and a parallel high speed tag RAM. The RAM address of each line in the data cache is the same as the low order portion of the main memory line address to which the entry corresponds, the high order portion of the main memory address being stored in the tag RAM. Thus, if main memory is thought of as $2^m$ blocks of $2^n$ "lines" of one or more bytes each, the i'th line in the cache data RAM will be a copy of the i'th line of one of the $2^m$ blocks in main memory. The identity of the main memory block that the line came from is stored in the i'th location in the tag RAM. Tag RAM typically also contains a "valid" bit corresponding to each entry, indicating whether the tag and data in that entry are valid.

When a CPU requests data from memory, the low order portion of the line address is supplied as an address to both the cache data and cache tag RAMs. The tag for the selected cache entry is compared with the high order portion of the CPU's address and, if it matches, then a "cache hit" is indicated and the data from the cache data RAM is enabled onto the data bus. If the tag does not match the high order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

In PC AT-compatible computers, the chipset performs all the management functions for the cache, while the cache data memory itself is located in SRAM off-chip. The tag memory is also located off-chip in a tag RAM. The user can specify, through a user setup program which programs registers in the chipset, which memory address ranges are to be cacheable and which are not. Due to the special nature of addresses A000-0h-BFFFFh and C800h-FFFFFh, these addresses are never cacheable in a typical chipset.

On system power-up, the external cache data and tag RAM both contain random data, including in the valid bit. Unless special precautions are taken, therefore, one or more lines of random data in the cache erroneously may appear to the chipset to contain valid information. One solution to this problem might be to use a dedicated tag RAM chip which has a "flush" pin. The CY7B181 chip manufactured by Cypress Semiconductor Corp. is one such chip. The flush pin would be connected to the system reset line to force the tag RAM to invalidate all its entries before the first instruction fetch by the CPU. Dedicated tag RAM chips are expensive, however, and preferably avoided in PC AT-compatible computers.

In some chipsets, the problem is solved using standard Static Ram (SRAM) chips to store tag RAM. These chipsets power up with caching disabled, and special routines in the setup program, or in a driver, invalidate each cache tag entry before enabling caching. Since the tag RAM is not directly accessible by the CPU in PC AT architectures, however, this technique usually requires the provision of special registers in the chipset through which the accesses can be made. It also requires specialized setup program code to accomplish the flush, which is undesirable since industry standard BIOS ROMs generally cannot be used. The technique also imposes a small time delay in the boot procedure which it would be desirable to avoid.

In the 386 WT chipset, a dedicated tag RAM was used which included an "invalidate" input pin to clear the valid bit for the entry currently being addressed. The chipset itself included an "invalidate" output for connection to that pin, and the chipset solved the power-up cache-flush problem by powering up in a default state with caching disabled and including logic to activate the invalidate output whenever caching was disabled. Thus, when the POST performed its standard memory test operation, which included (among other things) reads from all the bytes in a memory address range much larger than the maximum allowed cache size of 256k bytes, all the tag RAM entries were invalidated automatically. This solution avoided the need for any special setup program routines, but still required the use of expensive dedicated tag RAM.

SUMMARY OF THE INVENTION

Accordingly, it is an object of the present invention to address the power-up cache-flush problem while avoiding some or all of the problems raised by prior solutions.

It is another object of the present invention to provide a way of flushing a cache tag RAM during power-up initialization without using dedicated tag RAM chips and without modifications to standard setup program routines.

It is another object of the present invention to eliminate the "valid" bit from tag RAMs implemented with standard SRAMs in PC AT-compatible computer architectures.

According to the invention, a chipset is provided which powers up in a default state with caching disabled and which writes permanently non-cacheable tags into tag RAM entries corresponding to memory addresses being read while caching is disabled. Even though no "valid" bit is cleared, erroneous cache hits after caching is enabled are automatically prevented since any address which does match a tag in the tag RAM, is a non-cacheable address and will force retrieval directly from main memory anyway. The concept of writing permanently non-cacheable tags into tag RAM instead of clearing valid bits can be extended beyond the power-up cache-flush problem to normal operation, to thereby eliminate the need for any valid bit at all in tag RAMs implemented using standard SRAM. It can also be used in set associative cache memories.

BRIEF DESCRIPTION OF THE DRAWINGS

The invention will be described with respect to particular embodiments thereof and reference will be made to the drawings, in which:

FIGS. 2-7, 7a, 7b, 8, 9, 9a, 10a, 10b, 10c and 10d illustrate register field definitions in the system controller of FIG. 1;

DETAILED DESCRIPTION

Figure 1:
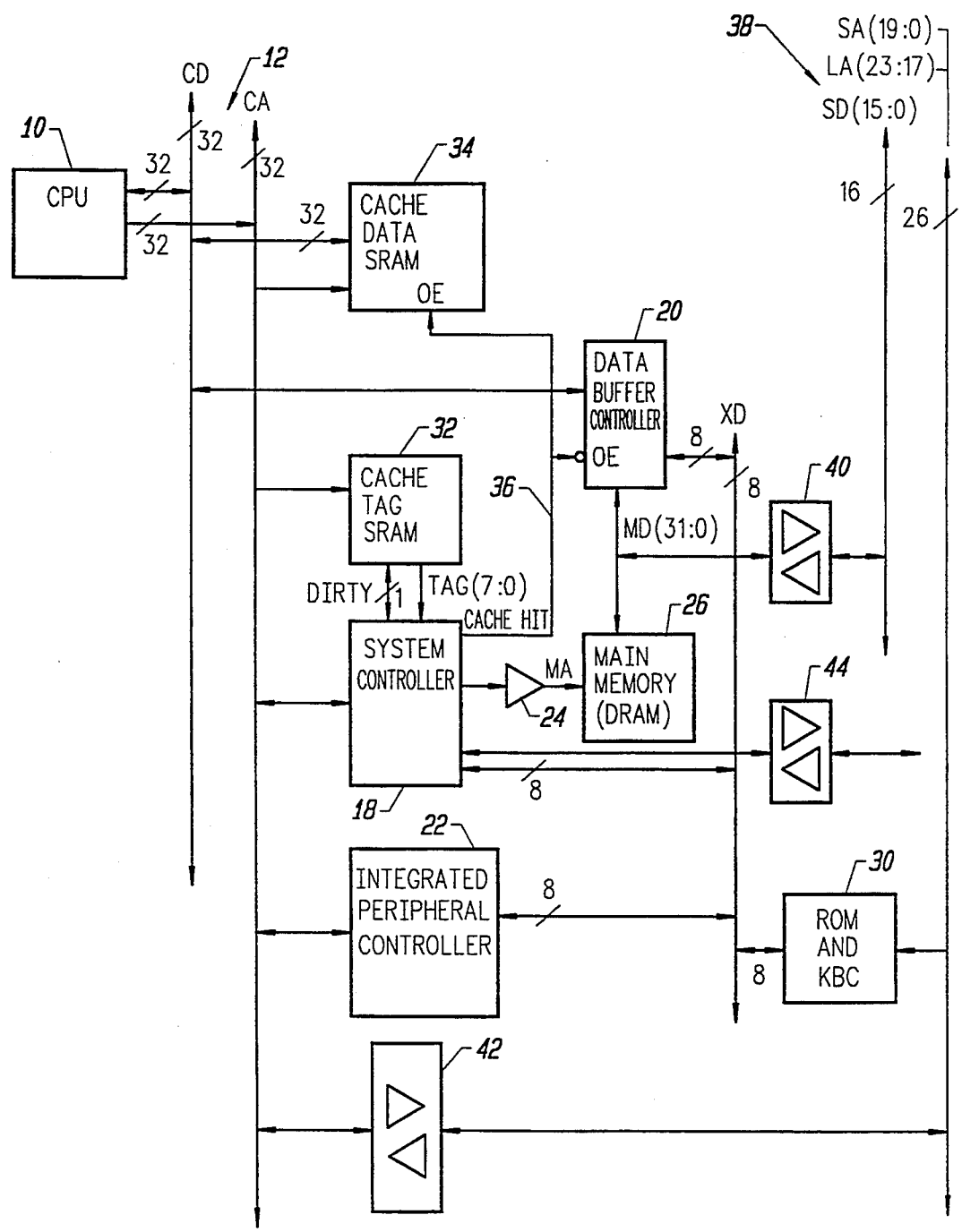
FIG. 1 is a block diagram of a PC AT-compatible computer architecture incorporating the invention.

FIG. 1 is a simplified block diagram of a PC AT Compatible Computer System which may incorporate the present invention. It comprises a CPU 10, which is preferably an 80386DX Microprocessor manufactured by Intel Corporation, Sunnyvale, Calif., coupled to a CPU bus 12. The CPU bus 12 (also called a local bus) comprises, among other things, a 32-bit CPU data bus CD and a 32-bit CPU address bus CA. A system controller (SYSC) chip 18 is coupled to the address lines of the CPU bus 12, and a data buffer controller (DBC) 20 is coupled to the data lines of CPU bus 12. The system controller may be an 82C391, and the data buffer controller may be an 82C392, both manufactured by OPTI, Inc., Santa Clara, Calif. Roughly, the system controller chip 18 performs duties related to the reset logic, system clock generation, the cache interface and cache control sub-system, local DRAM control sub-system, shadow RAM, AT bus state machine, bus arbitration logic, refresh logic, control of system BIOS ROM and I/O ports, a turbo switch and multiplexed DRAM addressing. The data buffer controller generally performs duties related to data bus conversion, parity generation and detection, clock generation and reset control, and any interface to a numeric co-processor (not shown). Also connected to the address lines of CPU bus 12 is an integrated peripheral controller (IPC) 22, which may be an 82C206 available from OPTI, Inc. The integrated peripheral controller includes a DMA controller, and interrupt controller, a timer peripheral and a real time clock (RTC).

The system controller 18 provides a memory address output which is coupled through a set of buffers 24 and a memory address bus MA to a main memory array of DRAM 26. Up to 64 megabytes of 32-bit wide DRAM can be accommodated in this array 26. The main memory DRAM 26 is also connected over a 32-bit memory data bus MD to the data buffer controller 20. The system controller 18 is also connected bi-directionally to an 8-bit ROM and keyboard data bus XD which is also connected bi-directionally to the data buffer controller 20, the integrated peripheral controller 22, and a ROM and keyboard controller unit 30. The ROM and keyboard controller (KBC) unit 30 includes the ROM BIOS at addresses F0000h-FFFFFh, possibly a socket for additional ROM at addresses E0000h-EFFFFh, and a keyboard controller chip such as an 8042 micro-controller manufactured by Intel Corp., and available pre-programmed for keyboard functions from Phoenix Technologies, Norwood, Mass.

The system controller 18 also communicates bi-directionally with Cache Tag SRAM 32 over an 8-bit TAG bus and a DIRTY line. The Cache Tag SRAM 32 and the Cache Data SRAM 34 are addressed by lines CA of the CPU bus 12, and the data SRAM 34 communicates bi-directionally with the CD data lines of the CPU bus 12. As will be seen, the system controller 18 includes Cache Tag Match Logic, and generates a Cache Hit signal which is communicated over a line 36 to an inverting output enable of data buffer controller 20, and to a non-inverting output enable of Cache Data SRAM 34.

The system also includes a so-called AT bus 38, which includes, among other things, a 16-bit data bus SD and an address bus including lines SA(19:0) and LA(23:17). The SA and LA lines both perform address functions, but the LA lines are valid earlier in an AT bus cycle and must be latched if needed later in the cycle. The SA lines are not valid as early as the LA lines, but remain valid longer. The SD lines are coupled to the memory data bus MD via a bi-directional buffer 40. Certain of the address lines on the AT bus 38 are coupled bi-directionally to the CPU bus 12 address lines CA via a bi-directional buffer 42, and certain control lines on the AT bus 38 are coupled to the system controller 18 via a set of buffers 44.

In general operation, on power up, a register bit in the system controller 18 comes up in a default state to indicate that caching is disabled. The first instruction fetch issued by the CPU 10 is to the address FFFFFFF0h, which is recognized by the system controller 18. The system controller 18 responds by causing a jump to the first instruction in the POST. The CPU fetches instructions continuing at that address. Since the POST is contained physically within the ROM in ROM/KBC unit 30, the system controller recognizes this and activates the buffers 42 to couple the address on the CPU address lines CA to the AT bus address lines, and then enables the ROM output onto the XD bus. The data buffer controller 20 receives the data from the ROM over the XD bus, assembles the 32-bit words expected by the CPU 10, and delivers them to the CPU 10 over the CD lines of CPU bus 12. Since caching is disabled, the system controller 18 will maintain the Cache Hit signal on line 36 low which enables the data buffer controller 20 output to the CD lines and disables the Cache Data SRAM 34 output to the CD lines.

As mentioned above, the POST performs many testing and initialization functions including, among other things, a test of all the main memory present in the system. This involves writing known information to each address in main memory, reading it back and comparing it to the information which was previously written. The POST also loads in an operating system from disk into main memory 26 and calls the user setup program.

The local bus 12 will now be described in more detail. It includes a plurality of address lines and a plurality of data lines, as well as a number of control lines and power and ground. The exact set of lines which make up the local bus is well known in the industry, and may be determined from various sources, including those identified above. For present purposes, it is sufficient to identify the following signal lines on the local bus ("#" indicates active low):

| | |
|---|---|
| CA(31:2) | Address lines. 32 bits of address are available. The high order 30 bits are provided on CA(31:2). |
| BE#(3:0) | Carries a 1-of-4 decode of the 2 low order address bits. |
| CD(31:0) | Data lines. |
| M/IO# | Memory/IO control line. When asserted high by the CPU, indicates that the address on CA is an I/O address as opposed to a main memory address. |
| READY# | Acknowledgment to CPU that a local memory access is complete. |
| CLK2 | Bus clock signal. |
| W/R# | Distinguishes write cycles from read cycles. |
| D/C# | Distinguishes data cycles, either memory or I/O, from control cycles which are: interrupt acknowledge, halt, and instruction fetching. |
| LOCK# | Indicates that other system bus masters are denied access to the system bus while it is active. |
| ADS# | Indicates that a valid bus cycle definition and address (W/R#, D/C#, M/IO#, BE0#, BE1#, BE2#, BE3# (or BHE# and BLE#) and CA) are being driven on the local bus. |
| NA# | Requests address pipelining. |
| BS16# | Allows direct connection of 32-bit and 16-bit data buses. |
| HOLD | Allows another bus master to request control of the local bus. |
| HLDA | Indicates that the CPU has surrendered control of its local bus to another bus master. |
| BUSY# | Signals a busy condition from a processor extension. |
| ERROR# | Signals an error condition from a processor extension. |
| PEREQ | Indicates that the processor extension has data to be transferred by the CPU. |
| INTR | A maskable input to CPU that signals the CPU to suspend execution of the current program and execute an interrupt acknowledge function. |
| NMI | A non-maskable input that signals the CPU to suspend execution of the current program and execute an interrupt acknowledge function. |
| RESET | Suspends any operation in progress and places the CPU in a known reset state. |

The various signals on the I/O bus are also well specified and well known in the industry. The Solari book identified above describes the lines in detail. For present purposes, only the following signals are important:

| | |
|---|---|
| SA(19:0) | 20 address lines. Sufficient to address 1MB of memory. Only SA(15:0) are used to address the 64k I/O address space, and only SA(9:0) are used to address the basic 1k AT I/O address space. |
| LA(23:17) | Additional address lines for addressing a 16MB memory address space on the I/O bus. The LA lines are valid earlier in an I/O bus cycle, but must be latched if needed later in the cycle. The SA lines are not valid as early as the LA lines, but remain valid longer. |
| BALE | Bus address latch enable line. In a CPU initiated I/O bus cycle, this line indicates when the address, AEN and SBHE# lines are valid. In other I/O bus cycles, the platform circuitry drives BALE high for the entire cycle. |
| SBHE# | System byte high enable. Indicates that current access or transfer is a 16-bit access or transfer (for which valid data will appear on SD(15:8) as well as SD(7:0)) rather than an 8-bit access or transfer. |
| AEN | When active, informs I/O resources on I/O bus to ignore the address and I/O command signals. Used primarily in DMA cycles where only the I/O resource which has requested and received a DMA acknowledgment signal (DACK#) knows to ignore AEN and respond to the I/O signal lines. Some systems include slot-specific $AEN_x$ signal lines. |
| SD(15:0) | 16 data lines. |
| MEMR#, SMEMR# | Read request lines to a memory resource on the I/O bus. SMEMR# is the same as MEMR# except that SMEMR# becomes active only when the read address is below 1MB (i.e., LA(23:20) = 0). |
| MEMW# SMEMW# | Write request lines to a memory resource on the I/O bus. SMEMW# becomes active only when the write address is below 1MB. |
| IOR# | Read request lines to an I/O resource on the I/O bus. |
| IOW# | Write request lines to an I/O resource on the I/O bus. |
| MEMCS16# | Memory chip select 16. Asserted by an addressed memory resource on the I/O bus if the resource can support a 16-bit access cycle. |
| IOCS16# | I/O chip select 16. Asserted by an addressed I/O resource on the I/O bus if the resource can support a 16-bit access cycle. |

-continued

| | | |
|---|---|---|
| SRDY# | | Synchronous Ready line. Also sometimes called OWS# or ENDXFR#. Activated by an addressed I/O resource to indicate that it can support a shorter-than-normal access cycle. |
| IOCHRDY# | | I/O channel ready line. Activated by an addressed I/O resource to indicate that the I/O access cycle is either a default-length cycle or a 0 wait state cycle. If the de-activates deactivates this line, the cycle will not end until it is re-activated. A de-activated IOCHRDY# supersedes an activated SRDY#. |
| MASTER# | | After requesting and receiving a DMA-acknowledged (DACK#) signal, an I/O bus add-on card can assert MASTER# to become the bus master. |
| REFRESH# | | Activated by refresh controller to indicate a refresh cycle. |
| IRQ(15, 14, 12:9, 7:3) | | Interrupt request lines to interrupt controller for CPU. |

-continued

| | | |
|---|---|---|
| DRQ(7:5, 3:0) | | DMA Request lines from I/O resource on I/O bus to platform DMA controller. |
| DACK(7:5, 3:0) | | DMA Acknowledge lines. |
| TC | | DMA terminal count signal. Indicates that all data has been transferred. |
| BCLK | | I/O bus clock signal. 6-8.33 MHz square wave. |
| OSC | | 14.318 MHz square wave. |

The system controller 18, data buffer controller 20 and integrated peripheral controller 22 make up the OPTI-386WB PC/AT chipset. The system controller 18 and data buffer controller 20 are described in detail in OPTI, "OPTI-386WB PC/AT Chipset (82C391/82C392/82C206) Preliminary 82C391/82C392 Data Book" (Mar. 28, 1991). The data book and each of the chips are incorporated herein by reference.

In pertinent part, the system controller 18 has the following input/output pins:

| Name | Direction | Description |
|---|---|---|
| | | CLOCK AND RESET |
| CLK2I | Input | Clock input for internal state machine. |
| BCLK | Output | BCLK to AT bus. |
| BCLKS | Input | BCLK Selection (OSCIN/6 or OSCIN/8) |
| RST1# | Input | Cold reset signal, deriving either from Powergood signal of power supply or from Reset Switch. |
| RST2# | Input | CPU Reset input from Keyboard Controller or from DBC ERST2# pin. |
| CPURST | Output | Reset for 386 processor. |
| OSCIN | Input | Clock input with frequency of twice the rated CPU clock frequency. Used to generate CPURST. |
| | | CPU INTERFACE |
| CA(31:17, 7:2) | Input | CPU Address Lines. |
| CA(16:8) | Both | CPU Address Lines 16-8. These are input pins during CPU cycle. CA(16:9) are output pins for DMA address A16-A9 by latching XD(7:0) during 16-bit DMA cycle and CA(15:8) are DMA address A15-A8 for 8-bit DMA cycle. |
| BE(3:0) | Both | Byte Enable 3-0. In CPU cycle, driven by CPU. In master and DMA cycle, they are outputs deriving from XA0, XA1 and SBHE# from AT bus. |
| ADS# | Input | Status input from CPU. This active low signal indicates the CPU is starting a new cycle. |
| WR# | Input | CPU Write or Read Cycle Status. It indicates a write cycle if high and read cycle if low. |
| DC# | Input | CPU Data or Code Cycle Status. It indicates data transfer operations when high, or control operations (code fetch, halt, etc.) when low. |
| MIO# | Input | CPU Memory or I/O Cycle Status. If MIO# is high, then the address on the address lines refers to a memory address. If MIO# is low, then the address on the address lines is an I/O address. |
| RDY# | Output | Ready output for CPU to terminate the current cycle. This pin is not a tri-state output. |
| TURBO | Input | Turbo mode selection. |
| LDEV# | Input | Local Device indication. Permits external circuitry (such as a coprocessor) to trap an access to a device on the I/O bus and inhibit the I/O bus cycle. |
| | | NUMERIC CO-PROCESSOR INTERFACE |
| NPERR# | Input | Numeric Processor Error indication. |
| NPRST | Output | Numerical Processor Reset. CPURST or I/O write to port F1h will assert NPRST. It is asserted for 40 clk2 cycles and 80387 cannot be accessed within 50 clk2 cycles after NPRST is negated. |
| RDYI# | Input | Local Device Ready Input, it will be synchronized by SYSC before sending to CPU. For 387 READYO# signal. |
| BSYTOG# | Output | Toggled BUSY# when no numeric coprocessor installed. |
| | | EXTERNAL CACHE CONTROL |
| TAG(7:0) | Input | TAG RAM Lines 7-0. These lines are inputs from tag |

-continued

| Name | Direction | Description |
|---|---|---|
| DRTY | Both | SRAM for TAG compare. Dirty Bit of Tag RAM to indicate its line of cache memory has been written into. |
| TAGWE# | Output | TAG RAM Write Enable. It is used to update the tag RAM. |
| CAEOE# | Output | External Cache Even Bank Output Enable. It is always activated for 32k and 128k cache memory. CAEOE# is also asserted when CA15 and CA17 are low for 64KB and 256KB cache memory, respectively. |
| CAOOE# | Output | External Cache Odd Bank Output Enable. It is deactivated for 32 KB and 128 KB cache. CAOOE# is only asserted when CA15 and CA17 are high for 64KB and 256KB cache memory respectively. |
| CAEWE# | Output | External Cache Even Bank Write Enable. It is always activated for 32k and 128k cache size and only asserted when CA15 is low for 64KB and CA17 is low for 256KB cache respectively. |
| CAOWE# | Output | External Cache Odd Bank Write Enable. It is only asserted when CA15 and CA17 is high for 64KB and 256Kb cache respectively. |
| DRTYW# | Output | Write strobe to Dirty Bit of Tag Ram. |
| A2CON | Output | Cache Address Bit 2 Toggle Control. It is toggled during cache read miss cycle. |
| A3CON | Output | Cache Address Bit 3 Toggle Control. It is toggled during cache read miss cycle. |
| LOCAL DRAM INTERFACE | | |
| DWE# | Output | DRAM Write Enable signal. |
| RAS(3:0)# | Output | DRAM Row Address Strobes. |
| CAS(15:0)# | Output | DRAM Column Address Strobes. |
| MA(10:0) | Output | DRAM Row/Column Address lines 10:0. |
| INTERFACE TO DATA BUS CONTROLLER CHIP | | |
| LMEN# | Output | Local Memory Accessed Indication. Used by DBC to control the bus flow. |
| DLE | Output | DRAM Read Data Latch Enable; used for parity checking. |
| MIO16# | Output | Latched AT-bus 16-bit Slave Status; used for bus conversion. |
| PCKEN# | Output | Parity checking Enable; used by Data Bus Controller to perform parity checking. |
| ATCYC# | Output | AT Cycle Indication for CPU cycle. |
| BUS ARBITRATION SIGNALS | | |
| HRQ | Input | DMA or Master Cycle Request from IPC. |
| HLDA1 | Output | DMA or Master Cycle Granted Notice. |
| OUT1 | Input | Refresh Request from Timer1 Output. |
| HLDA | Input | CPU Hold Acknowledge. |
| ADS8 | Input | 8-bit DMA Transfer Address Strobe. The SYSC has to latch XD(7:0) by using ADS8 and translate to CA(15:8) outputs. |
| AEN8# | Input | 8-bit DMA Cycle Indication. |
| ADS16 | Input | 16-bit DMA Transfer Address Strobe. The SYSC has to latch XD(7:0) by using ADS16 and translate to CA(16:9) outputs. |
| AEN 16# | Input | 16-bit DMA Transfer Indication. |
| HOLD | Output | Hold request to CPU. Hidden refresh will not hold the CPU. |
| RFSH# | Both | AT Refresh Cycle Indication. It is an input pin during master or DMA cycle. |
| I/O BUS INTERFACE | | |
| CA0 | Both | System Address Line 0, it is an input pin during master or 8-bit DMA cycle; becomes output pin during CPU, 16-bit DMA cycle or refresh cycle. |
| CA1 | Both | System Address Line 1, it is an input pin during master or DMA cycle; becomes output pin during CPU or refresh cycle. |
| GATEA20 | Input | GateA20 input from 8042 or DBC emulated gate A20 pin. |
| GA20 | Both | Gated AT bus A20; connected to AT bus LA20 indirectly through a buffer. It's an input pin during master cycle. |
| XD(7:0) | Both | Peripheral Data Bus Line 7-0. Two purposes for these pins: program the internal index register, latch the DMA high order address. |
| CHRDY | Input | Channel Ready Input from AT-Bus. It is a schmitt trigger input pin. |
| NOWS# | Input | Zero Wait State Input from AT-BUS. It is a schmitt trigger input pin. System BIOS ROM is treated as AT zero wait state cycle. |
| IO16# | Input | 16-bit IO Slave Cycle Status. It is a schmitt trigger input pin. |

-continued

| Name | Direction | Description |
|---|---|---|
| M16# | Input | 16-bit Memory Slave Cycle Status. It is a schmitt trigger input pin. |
| IORD# | Both | AT IO Read Command. It is output in CPU cycle. It is input DMA or master cycle. |
| IOWR# | Both | AT IO Write Command. It is output in CPU cycle. It is input in DMA or master cycle. |
| MRD# | Both | AT Memory Read Command. It is output in CPU cycle. It is input in DMA or master cycle. |
| MWR# | Both | AT Memory Write Command. It is output in CPU cycle. It is input in DMA or master cycle. |
| SMRD# | Output | AT Memory Read Command, for address below 1MB. It is active during refresh cycle. |
| SMWR# | Output | AT Memory Write Command, for address below 1MB memory space. |
| ALE | Output | AT Bus Address Latch Enable to represent that the AT cycle has started. It is Hi-Z during non-CPU cycle. |
| SBHE# | Both | Byte High Enable. In CPU cycle, it is output according to BE(3:0). In master cycle, it is input. |
| INTA# | Output | Interrupt Acknowledge Cycle Indication. Hold will not send to CPU between the INTA* cycles. |
| ROMCS# | Output | System BIOS ROM Output Enable. System BIOS ROM accessing could be either 8-bit or 16-bit. The system controller 18 supports both 8-bit and 16-bit reads from BIOS ROM. If 8-bit ROM is selected, the system BIOS ROM will reside physically on the XT bus as shown in FIG. 1. If 16-bit ROM cycles are required, the BIOS ROM must be located physically on the SD bus. In this case the ROMCS# output of system controller 18 should be connected to the M16# input of system controller 18 via an open collector buffer to indicate to the system controller 18 that the current system BIOS is to be read via a 16-bit I/O cycle. |
| | | GROUND AND VCC |
| VCC | Input | +5V |
| GND | Input | VSS or Ground. |

The pin signals for data buffer controller 20 are as follows:

| Name | Direction | Description |
|---|---|---|
| | | CLOCK AND RESET |
| OSCX1 | Input | 14.3 Mhz osc. input. |
| OSCX2 | Output | 14.3 Mhz osc. output. |
| OSC | Output | 14.3 Mhz osc. output to AT bus. |
| OSC12 | Output | 1.19 Mhz output to IPC22. |
| OSC2 | Output | 14.3 Mhz/2 output for 8042 clock. |
| OSC2# | Output | Complement of OSC2. |
| PWRGD | Input schmt | Power Good Status from power supply. |
| RSTSW | Input schmt | Reset Switch Input. |
| RST1# | Output | Power-up or cold Reset signal derived from PWGD# or RSTSW. |
| | | ADDRESS AND DATA BUSES |
| D(31:0) | Both | CPU Data Bus. |
| MP(3:0) | Both | Local DRAM bus parity bits. |
| A(9:0) | Input | Buffered AT SA(9:0) lines. |
| SBHE | Input | Byte High Enable from AT bus and SYSC. |
| BE(3:0)# | Input | CPU Byte Enables; used in DBC for data bus parity checking of valid byte. |
| MD(31:0) | Both | Local DRAM Data Bus. |
| XD(7:0) | Both | XD bus lines. |
| | | BUS ARBITRATION |
| HLDA | Input | Hold Acknowledge from CPU in response to hold request. |
| AEN8# | Input | 8-bit DMA Cycle Indication. |
| AEN16# | Input | 16-bit DMA Cycle Indication. |
| AEN# | Output | DMA Cycle Indication. |
| MASTER# | Input | Master Cycle Indication. |
| RFSH# | Input | Refresh Cycle Indication. |

-continued

| Name | Direction | Description |
|---|---|---|
| INTERFACE TO SYSTEM CONTROLLER 18 | | |
| INTA# | Input | Interrupt Acknowledge, used to direct the data flow. |
| ROMCS# | Input | System BIOS ROM Chip Select. Used to direct the data bus flow. |
| LMEN# | Input | Local Memory Enable. Indicates the current cycle is a local DRAM access. used to control bus direction. |
| WR# | Input | CPU write or read indication. |
| DLE | Input | DRAM Read Data Latch, used to latch the data for parity checking. |
| ATCYC# | Input | AT Cycle Indication. If asserted, the current access is AT bus cycle. |
| PCKEN# | Input | Parity Checking Enable, to enable the Parity error signal, if any. |
| MIO16# | Input | 16-bit slave devices access indication. It is used to control the data flow path. |
| IOWR# | Input | AT bus I/O write command. |
| IORD# | Input | AT bus I/O read command. |
| MEMRD# | Input | AT bus Memory Read Command. |
| MEMWR# | Input | AT bus Memory Write Command. |
| DWE# | Input | DRAM Write Enable, used to enable the write to DRAM. |
| NUMERIC PROCESSOR INTERFACES | | |
| NPERR# | Input | Numeric Processor Error from 80387. it is an active low input indicating that an unmasked error happens. |
| NPBUSY# | Input | Numeric Processor Busy from 80387 to indicate a coprocessor instruction is under execution. |
| NPRST | Input | Reset Numeric Processor. |
| BUSY# | Output | Latched Coprocessor Busy Output to 80386 to indicate a NPBUSY# or NPERR# signals has occurred. |
| BSYTOG# | Input | Busy Toggled Control; used to toggle the BUSY# signal when 80387 coprocessor is not installed. |
| INT13 | Output | Numeric Processor Interrupt. It is an interrupt request from numeric coprocessor and connected to IRQ13 of interrupt controller. |
| ERR# | Output | Error signal to 80386. It reflects the NPERR# signal during the period from RST4# active to first ROMCS#. |
| WINT | Input | Weitek 3167 Co-processor Interrupt Request. |
| PREQI | Input | 80387 coprocessor Request Input. |
| PREQO | Output | Numeric Processor Request to 80386. |
| MISCELLANEOUS SIGNALS | | |
| KBDCS# | Output | Keyboard Controller Chip Select. |
| NMI | Output | Non-maskable interrupt, due to parity error from local memory or AT bus channel check. |
| SPKD | Output | Speaker Data Output, derived from the function of OUT2 and port 61H bit1. |
| CHCK# | Input | AT-BUS Channel Check. |
| EGTA20 | Output | GateA20 output. It is generated by emulating Keyboard GATEA20. |
| ERST2# | Output | RST2# output. It is generated by emulating keyboard RST2#. |
| SDEN# | Output | MD to SD buffer enable signal. |
| SDIR1# | Output | MD(7:0) to SD(7:0) Buffer Direction Control. |
| SDIR2# | Output | MD(15:8) to SD(15:8) Buffer Direction Control. |
| GATE2 | Output | Timer 2 Gate Control. |
| ASRTC | Output | Real Time Clock Address Strobe. |
| OUT2 | Output | Timer 2 Output. |
| FAST | Input | FAST is an active high input which will enable the emulation of Fast GATEA20 and Reset Control Enable. |
| M16# | Output | Master Access Local DRAM invalidation. |
| GROUND AND VCC | | |
| VCC | | +5V. |
| GND | | VSS or Ground. |

The integrated peripheral controller is essentially an industry standard product and is described in United Microelectronics Corp., "UM82C206 Integrated Peripheral Controller", preliminary data sheet, (February, 1991), incorporated herein by reference.

The chips 20 and 22 operate in response to a plurality of command and configuration "index" registers which may be written to or read from by the CPU. In order to access an index register, the CPU must first write the index number to an I/O Port such as 22h, then read or write data to or from another I/O Port such as 24h. Most of the registers are located in the system controller chip 18, but a few are located in the data buffer controller 20. The registers are described below only as required for an understanding of the invention.

Control register 1 controls various miscellaneous functions of the system controller chip 18. It is accessible at index location 20h, and its field definition is set forth in FIG. 2.

Control register 2, accessible at index location 21h, contains several miscellaneous control bits as well as certain cache related control bits. In particular, as evidenced in FIG. 3, a system according to FIG. 1 can be configured with a 32k-byte cache, 64k-byte cache, a 128k-byte cache or a 256k-byte cache. The setup program writes bits 3:2 of index register 21h to configure the system controller 18 with the cache size. The setup program also writes bits 1:0 to indicate the size of each SRAM chip and the number of wait states to insert on cache write. Index 21h also contains the cache enable bit at bit 4. This bit powers up in the state which disables caching and, as will be seen, controls tag flushing.

FIGS. 4, 5 and 6 describe shadow RAM control registers I, II, III, respectively, accessible at index locations 22h, 23h and 26h, respectively. Roughly, shadow RAM can be enabled (such that all reads and writes occur to DRAM rather than corresponding ROM locations) in 32k-byte blocks from addresses C0000h–EFFFFh. The entire C block can also be disabled as a unit, as can the entire D block or the entire E block. The entire C block can also be write protected as a unit, as can the entire D block and the entire E block. To permit copying from ROMS on the AT bus into shadow RAM for the C, D and E blocks, activating bit 6 of index location 26h will cause all reads from these addresses to occur from the AT bus and all writes to go to DRAM. The F block has only one bit to control its shadow RAM, bit 7 of index location 22h if activated, all reads are from ROM and all writes are to DRAM to permit copying. If deactivated, after copying, all reads are from DRAM and no writes are permitted.

DRAM control register I, accessible at index location 24h, permits the user to program the bank organization of the DRAMS used in main memory 26. The field definition is shown in FIGS. 7, 7a and 7b.

DRAM control register II, accessible at index location 25h, allows the system to be programmed for 0, 1 or 2 additional wait states on reading from main memory 26, and 0, 1, 2 or 3 additional wait states on writing to main memory 26. The field definition for index location 25h is shown in FIG. 8.

Control of the caching function is achieved through index locations 27h–2Bh. Control register III, accessible at index location 27h, contains at bit 7 a bit which enables or disables all caching. On power up, this bit is in the default state of 1, disabling all caching. Index 21h bit 4 will override the state of this bit to disable caching.

FIG. 9 describes the field of definition for index location 27h. As can be seen, when caching is enabled, bits 3:0 of index 27h indicate the maximum cacheable address range. The code for bits 3:0 of index 27h is set forth in FIG. 9A. If the cache is 32k bytes, the maximum cacheable address range is 8 megabytes. If the cache is 62k bytes, the maximum cacheable address range is 16 megabytes. If the cache is 128k bytes, then the maximum cacheable address range is 32 megabytes, and if the cache is 256k bytes, the maximum cacheable address range is 64 megabytes.

Addresses A0000h–BFFFFh and C8000h–FFFFFh are permanently non-cacheable, and the cacheability of addresses C0000h–C7FFFh is controlled by index 27h bit 4. System controller 18 also permits user specification of two non-cacheable memory blocks. The first of these is programmed using index locations 28h and 29h, and the second is programmed using index locations 2Ah and 2Bh. The starting address for a non-cacheable block must have the same granularity as the block size. For example, if a 512k byte non-cacheable block is selected, its starting address must be a multiple of 512k bytes. Consequently, only address bits 23:19 are significant to identify the block. FIGS. 10A–10D set out the field definitions for index locations 28h and 29h. As can be seen from FIGS. 10A and 10B, bits 7:5 of index 28h contain a code indicating the non-cacheable block size, and bits 1:0 of index 28h and 7:0 of index 29h contain bits 25:16 of the address of the non-cacheable block. FIG. 10C defines the block size code in index 28h bits 7:5, and FIG. 10D explains which of address bits 23:16 are valid for each selected block size. In these figures, V indicates a valid bit and x indicates a bit which is ignored. The second non-cacheable block, defined in index locations 2Ah and 2Bh, follows field definitions identical with those of index 28h and 29h. If a memory read or write occurs on the CPU bus 12 (FIG. 1) to an address which is within one of the non-cacheable memory blocks, whether or not caching is enabled, the system controller 18 causes the information to be read or written from or to main memory 26 rather than the cache. Neither the cache data SRAM 34 nor the cache tag SRAM 32 is updated.

The data buffer controller performs data bus conversion when the CPU accesses 16- or 8-bit devices through 32/16-bit instructions. The bus conversion is also supported for DMA and master cycles for transfers between main memory 26 or cache data SRAM 34, and devices which reside on the AT bus 38. During the process, the data buffer controller 20 provides all the signals necessary to control the external bi-directional data buffers.

DBC control register index 21h contains a write-only copy of control register index 21h of SYSC in bit 7:4. Bits 3:0 are not used. The data buffer controller 20 also includes four registers accessible directly at I/O port addresses 60h, 61h, 64h and 70h. These registers are not important to an understanding of the present invention.

Figure 11:
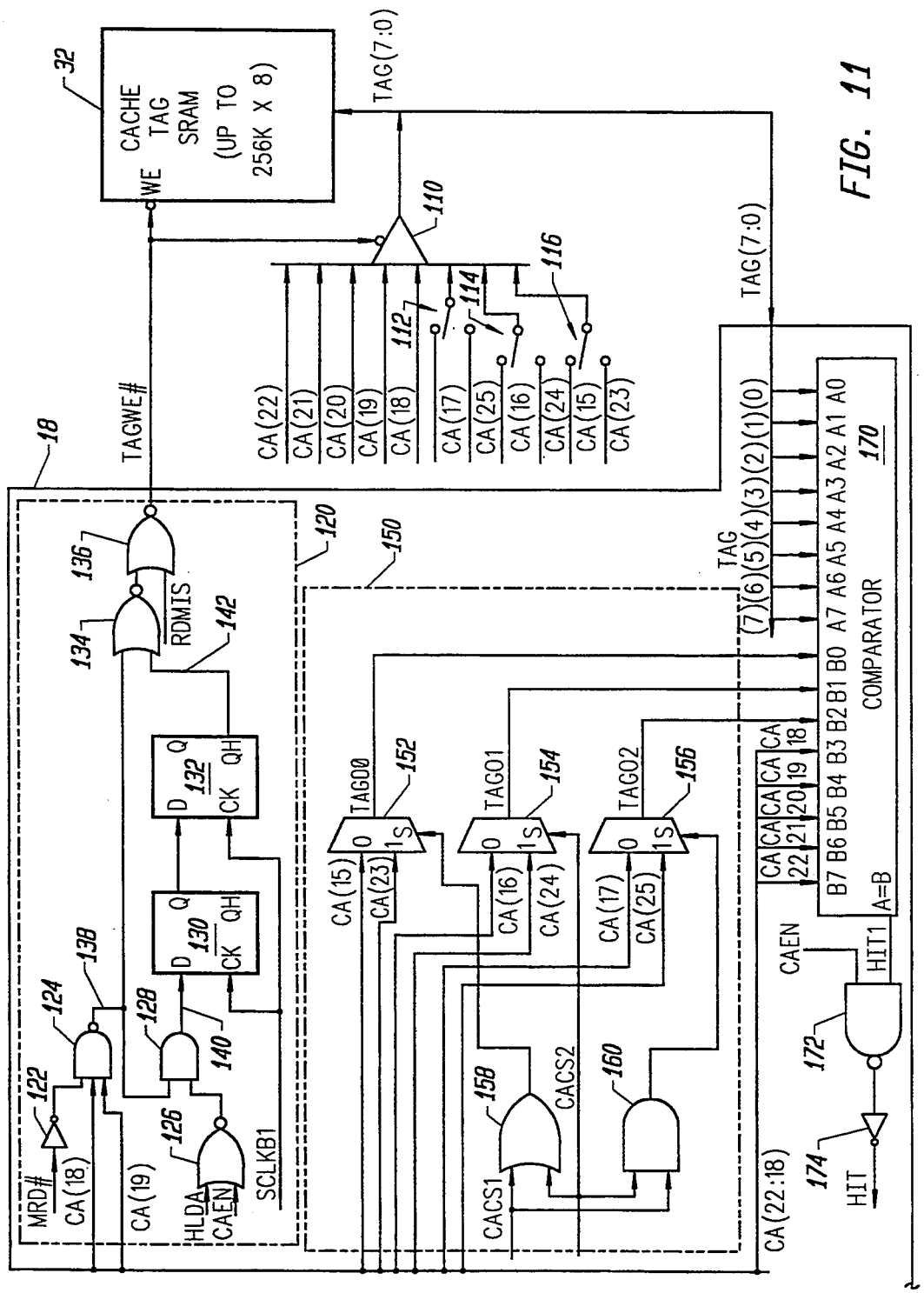
FIG. 11 is a block diagram of cache management related circuitry incorporating the invention.

FIG. 11 is a block diagram showing the cache tag SRAM 32 of FIG. 1 and relevant circuitry of the system controller 18. The cache tag SRAM 32 has an inverting write enable (WE) input which is connected to the TAGWE# output of system controller 18, and a bi-directional TAG bus which is connected as inputs to the TAG(7:0) pins on the system controller 18. An octal buffer 110 is also provided with its 8 inputs connected respectively to CPU address lines CA(22), CA(21), CA(20), CA(19), CA(18), the common of a jumper 112, the common of a jumper 114 and the common of a jumper 116. Jumper 112 connects its common to selectably CA(17) or CA(25), and the jumper 114 connects its common to selectably to CA(25) or CA(16). The jumper 116 connects its common to selectably CA(15) or CA(23). The 8 outputs of the buffer 110 are connected to TAG(7:0), respectively, and the active low output enable of buffer 110 is connected to the TAGWE# output of system controller 18.

Inside system controller chip 18, TAGWE circuitry 120 generates the TAGWE# output signal from an MRD# signal, CPU address lines CA(19:18), HLDA a CAEN signal, an RDMIS signal and a clock signal SCLKB1. MRD# is generated from external signals by means not shown and indicates that a non-cacheable AT bus memory read cycle is underway. HLDA is generated by the CPU, 10 and indicates that another device has control over the CPU bus 12. The CAEN signal derives from index register 21h bit 4 ("cache enable"). RDMIS is generated from other sources not shown and not important to the invention, and generally indicates that a read miss has occurred during normal operation while caching is enabled. SCLKB1 is a half-frequency version of the CPU clock.

The MRD# signal is connected to the input of an invertor 122, the output of which is connected to one input of a 3-input NAND gate 124. The other two inputs of NAND gate 124 are connected to CA(19:18). The HLDA signal and the CAEN signal are each connected to a respective input of a 2-input NOR gate 126. The output of NOR gate 126 and the output of NAND gate 124 are each connected to respective inputs of a 2-input AND gate 128, the output of which is connected to the D input of a D flip-flop 130. The Q output of flip-flop 130 is connected to the D input of another D flip-flop 132, the inverting (QN) output of which is connected to one input of a 2-input NOR gate 134. The other input of the 2-input NOR gate 134 is connected to the output of NAND gate 124. The clock inputs to both of the flip-flops 130 and 132 are connected to the SCLKB1 signal. The output of NOR gate 134 is connected to one input of another 2-input NOR gate 136, the other input of which is connected to receive the RDMIS signal. The output of NOR gate 136 forms the TAGWE# output of system controller chip 18.

The operation of TAGWE circuitry 120 is such as to generate a pulse on the TAGWE# output only when a memory read access is being performed by the CPU over the AT bus, from an address in the range C0000h–FFFFFh, while caching is disabled according to index register 21h bit 4. The circuitry 120 will also activate the TAGWE# signal whenever the RDMIS signal becomes active, but this situation is not important to the invention and will not further be described. Assuming RDMIS is low (inactive), the circuitry 120 will activate TAGWE# (active low) only when the output of NOR gate 134 is high. This in turn will be the case only when both inputs of the NOR gate 134 are low. Accordingly, a zero logic level on either input of NOR gate 134 will prevent TAGWE# from becoming active.

It can be seen that TAGWE# will never be active when MRD# is inactive (high) since that would force a 1 on the output of NAND gate 124 and accordingly one of the inputs of NOR gate 134. Similarly, both bits CA(19:18) must be high for the output of NAND gate 124 to be low. NAND gate 124 thus ensures that TAGWE# will not be activated unless a memory read cycle is taking place over the AT bus from an address in the C, D, E or F block of main memory (where CA(19) and CA(18) are high). Note that the bits above CA(19) need not be checked since the only cacheable memory space in the system which resides on the AT bus is in the C-F blocks. Higher addresses all must reside on the local bus to be cacheable, and accesses to these addresses will not activate MRD#.

The other input of NOR gate 134 cannot go low unless the D input of flip-flop 130 was high two clock cycles earlier. This can only occur if the output of NOR gate 126 was high, which means both HLDA and CAEN must have been low. HLDA=0 means the address being provided on the CPU address bus is generated by the CPU, and CAEN=0 means caching is disabled. Accordingly, assuming RDMIS is low the TAGWE circuitry 120 will generate a low (active) signal on TAGWE# only on a memory read cycle over the AT bus, from an address in C, D, E or F block, generated by the CPU, while caching is disabled.

Figures 12, 13:
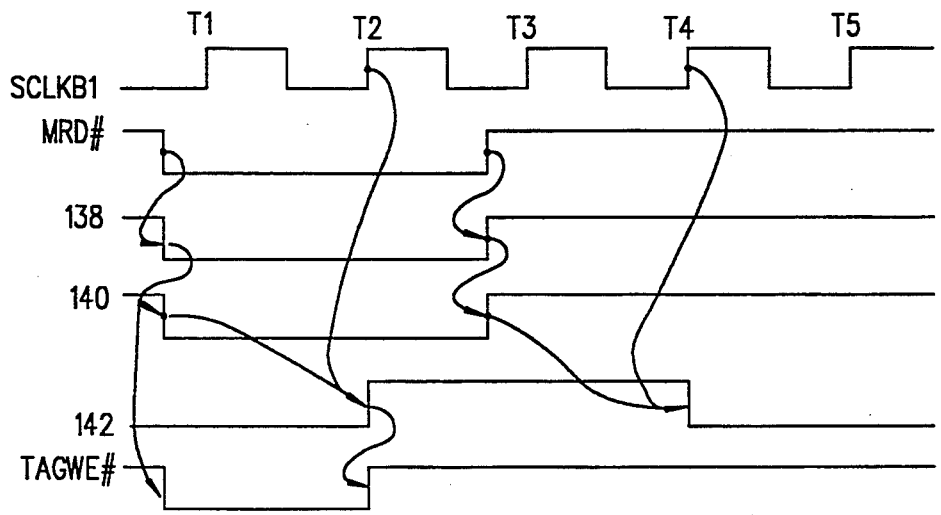
FIG. 12 is a timing diagram useful for understanding a portion of FIG. 11.
FIG. 13 is a table useful for explaining the operation of an aspect of FIG. 11.

FIG. 12 is a timing diagram showing how the circuitry 120 generates a pulse when the conditions are satisfied. The diagram assumes HLDA, CAEN and RDMIS are all 0, and CA(19:18) are both high. The diagram follows TAGWE# when MRD# goes low to indicate that a memory read over the AT bus is occurring.

At the start of FIG. 12, MRD# is high, thereby causing the signal at node 138 (the output of NAND gate 124) to be high, which in turn causes the signal at node 140 (the output of AND gate 128) to be high. 140 is assumed to have been high for some time, so the signal at node 142 (the inverting output of D flip-flop 132) is low. Since the signal at node 138 is high, TAGWE# is low at the start of FIG. 12.

At some time prior to a time T1, MRD# goes low. This causes node 138 to go low, which in turn immediately cause node 142 to go low. Since nodes 138 and 142 are both low at this point, the TAGWE# signal will also go low.

At time T1, SCLKB1 has a rising edge. This loads the low logic level on node 140 into D flip-flop 130, but does not otherwise affect the circuitry. At the next rising edge of SCLKB1 occurring at time T2, the low of node 140 first appears at node 142 as a logic 1. This immediately causes TAGWE# to return to its high level.

Some time later, for example, at a time between T2 and T3, MRD# returns to its high level, thereby bringing the signal on node 138 high and the signal on node 140 high. The signal on node 142 remains high until time T4, which is the next rising edge of SCLKB1, at which time the high logic level which was present at node 140 is transferred to node 142 as a low logic level. This change on node 142 does not affect TAGWE# at this time, however, since the signal at node 138 is already high and a change at node 142 cannot affect the output. Accordingly, it can be seen that TAGWE circuitry 120 generates a low-going pulse for at least a full SCLKB1 cycle in response to a memory read with the required conditions.

System controller chip 18 also includes tag bit multiplexing circuitry 150, which generates three tag bits TAG00, TAG01 and TAG02 for match comparator purposes. As mentioned above, the system controller 18 can be used with a 32k, 64k, 128k or 256k-byte cache as specified in index 21h bits 3:2. Each size requires a different set of address bits for addressing the cache tag SRAM 32, and a different set of address bits to be stored as tag data in the cache tag SRAM 32. In order to maintain the 8-bit width of cache tag SRAM 32, three of its tag data bits are multiplexed.

FIG. 13 explains this in more detail. The four different cache sizes are shown on four separate lines in FIG. 13, with the index 21h(3:2) code corresponding to that cache size in the first and second columns. The fourth column states which bits of the CPU address bus CA are used to address the tag SRAM. Since each entry in the cache contains a line of 16 bytes of data, CA(3:0) are not needed to address an entry in the tag SRAM 32. Thus, for a 32k-byte cache, only CA(14:4) are necessary to address the tag SRAM. Similarly, for a 64k-byte cache, CA(15:4) are needed. CA(16:4) are needed to address a 128k-byte cache, and CA(17:4) are needed to address a 256k-byte cache.

The tag data stored in cache tag SRAM 32 is always the next eight address bits above the bits which are used to address the tag SRAM. Thus, for a 32k-byte cache, CA(22:15) are stored as a tag. In a 64k-byte cache, CA(23:16) is stored as the tag. In a 128k-byte cache, CA(24:17) is stored as the tag, and in a 256k-byte cache, CA(25:18) is stored as the tag. Since it does not matter in which order the various bits of a tag are stored in the tag RAM, the computer of FIG. 1 stores them in a manner which minimizes the circuitry required to alter which bits are stored. In particular, as shown in FIG. 13, TAG(7:3) always stores CA(22:18). TAG(2) stores CA(17) for the 32k, 64k and 128k-byte caches, and stores CA(25) for the 256k-byte cache. TAG(1) stores CA(16) for the 32k and 64k-byte caches, and stores CA(24) for the 128k and 256k-byte caches. Finally, TAG(0) stores CA(15) for a 32k-byte cache, and stores CA(23) for each of the other three cache sizes. When tag data is being written into the cache tag SRAM 32, the jumpers 112, 114 and 116 select the appropriate CA bit to write into bits TAG(2:0). The user must set the jumpers properly for the cache size that has been selected. When tags are read from the cache tag SRAM 32, multiplexing circuitry 150 selects the appropriate CA bits for comparing to bits TAG(2:0) which are read from tag SRAM 32.

In particular, multiplexing circuitry 150 includes three multiplexers 152, 154 and 156. Multiplexer 152 has its '0' input connected to the CA(15) line and its '1' input connected to the CA(23) line. The multiplexer 154 has its '0' input connected to CA(16) and its '1' input connected to CA(24). The multiplexer 156 has its '0' input connected to CA(17) and its '1' input connected to CA(25). Index 21h(3:2) are provided as signals CACS2 and CACS1, respectively, to a pair of inputs to an OR gate 158, the output of which is connected to the select input of multiplexer 152. CACS1 and CACS2 are also connected to the two inputs of an AND gate 160, the output of which is connected to the select input of multiplexer 156. CACS2 is also connected directly to the select input of multiplexer 154. It can be seen that multiplexer 152 will output, on a line identified as TAGO0, CA(15) only if both CACS1 and CACS2 are low, and will otherwise output CA(23). Multiplexer 154 will output, on a line identified as TAGO1, CA(16) as long as CACS2 is low and CA(24) as long as CACS2 is high. Multiplexer 156 will output, on a line identified as TAGO2, CA(25) only if both CACS1 and CACS2 are high, and CA(17) otherwise.

System controller 18 also includes a match comparator 170 having inputs A(7:0) and B(7:0). The inputs A(7:0) are connected to receive the TAG(7:0) bits from the cache tag SRAM 32. Inputs B(7:3) are connected to receive CA(22:18), and B2, B1 and B0 are connected to receive, respectively, TAGO2, TAGO1 and TAGO0 from the multiplexing circuitry 150.

When the two 8-bit inputs match, a logic 1 is generated on an HIT1 output of the comparator 170. The HIT1 signal is NANDed with the CAEN (cache enable) signal by NAND gate 172, the output of which is connected to an invertor 174, the output of which forms the HIT signal. It can be seen that the HIT signal, which is used by other circuitry (not shown), indicates that a cache hit has occurred while caching was enabled. The jumpers 112, 114 and 116 and the multiplexing circuitry 150 ensure that the correct address bits will be compared to the correct tag bits in the match comparator 170.

It can be seen that when a low going pulse occurs on TAGWE#, the appropriate address bits from the CPU address bus are enabled onto the TAG(7:0) bus by buffer 110, and written to the appropriate entry in tag SRAM 32. Assuming RDMIS remains low (which will be the case as long as caching is disabled), this will only occur on a memory read by the CPU 10, from C, D, E or F block, while caching is disabled. And since CA(18) and CA(19) must both be high for this to occur, and these are two of the bits which are written into the tag entry in tag SRAM 32, it is assured that only addresses in the E and F blocks will be written into tag SRAM 32. Since addresses within these two blocks are permanently non-cacheable, a read from corresponding addresses after caching has subsequently been enabled, will never result in invalid data being read erroneously from cache data SRAM 34.

In operation, the system powers up with index 21h bit 4 at a default 0 value, thereby disabling caching. This brings CAEN low (FIG. 11). As part of the normal memory testing procedures in the POST, the CPU 10 will read from at least one byte (and typically many more) of each 16-byte line in the C, D, E and F blocks. For each of these lines, the circuitry of FIG. 11 will write the C, D, E or F block tag into the cache tag SRAM entry corresponding to that line. Since the tag identifies a non-cacheable address, this procedure effectively invalidates each such line in the cache.

It can be seen that this procedure will work correctly for any cache size up to 128k byte, since the E and F blocks are permanently non-cacheable and together cover 128k bytes. That is, each line address in a 128k cache has a corresponding line address in the E and F blocks. Since the POST reads at least one byte from each line address within the E and F blocks, it is assured that each line in the 128k-byte cache will be invalidated by writing a corresponding E or F block tag into the tag SRAM 32.

However, for a 256k-byte cache, the 32k-byte range between C0000h and C8000h will receive tags corresponding to addresses between C0000h and C8000h. This range is optionally cacheable according to index 27h bit 4 as previously mentioned. Accordingly, if the POST or the user enables caching within this range shortly after initialization, then the data in cache data SRAM 34 corresponding to these entries in cache tag SRAM 32 will erroneously be interpreted as valid. To correct this problem, after caching has been enabled (both generally and in C000h–C800h), the setup program should read 32k bytes from lines corresponding to this address range, but from a different 256k-byte block of memory. For example, it could read from addresses 00000h–08000h. Such a routine would generate a cache miss for each line within that 32k-byte portion of the cache, thereby causing those lines to be filled and valid tag information written into the tag SRAM 32.

The invention has been described with respect to particular embodiments thereof, and numerous modifications are possible within its scope.

I claim:

1. A method for managing a cache memory having a plurality of entries, each entry having a tag portion and a data portion, for use with a secondary memory having storage for bytes of data at secondary memory addresses, said storage being organized into a plurality of secondary memory data lines, each of said secondary memory addresses designating at least one of the data bytes in one of said secondary memory data lines, said cache memory having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable, for use further in a computer system permitting enablement and disablement of caching, said method comprising the steps, in response to a read access to a provided secondary memory read address, of:

returning data from the data portion of a given one of said cache memory entries, which entry maps to the secondary memory data line containing the data bytes designated by the provided secondary memory read address, only if (a) the tag portion of said given cache memory entry associates said given entry with the secondary memory data line containing the data bytes designated by the provided secondary memory read address, (b) said provided secondary memory read address is outside of all of said secondary memory address ranges which are defined as noncacheable, and (c) caching is enabled;

generating a cache miss indication if the tag portion of none of the cache memory entries which map to the secondary memory data line containing the data bytes designated by the provided secondary memory read address, associates its entry with the secondary memory data line containing the data bytes designated by the provided secondary memory read address; and generating a cache miss indication also if said provided secondary memory read address is within one of said secondary memory address ranges which is defined as noncacheable; and returning data from said secondary memory instead of said cache memory in response to said cache miss indications, said method further comprising the step of invalidating a selected one of said cache memory entries by writing into the tag portion of said selected entry a tag which associates said selected entry with a secondary memory data line that is within a first one of said secondary memory address ranges which is defined as noncacheable, said step of invalidating a selected one of said cache memory entries eliminating a requirement for a tag-valid bit for each entry of said cache memory.

2. A method according to claim 1, wherein said tag written into the tag portion of said selected entry in said step of invalidating said selected cache memory entry, is derived from said provided secondary memory read address.

3. A method according to claim 1, wherein said first secondary memory address range which is defined as noncacheable is defined as permanently noncacheable.

4. A method for managing a cache memory having a plurality of entries, each entry having a tag portion and a data portion, for use with a secondary memory having storage for bytes of data at secondary memory addresses, said storage being organized into a plurality of secondary memory data lines, each of said secondary memory addresses designating at least one of the data bytes in one of said secondary memory data lines, said cache memory having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable, for use further in a computer system permitting enablement and disablement of caching, said method comprising the steps, in response to each read access to a provided secondary memory read address, of:

returning data from the data portion of a given one of said cache memory entries, which entry maps to the secondary memory data line containing the data bytes designated by the provided secondary memory read address, only if (a) the tag portion of said given cache memory entry associates said given entry with the secondary memory data line containing the data bytes designated by the provided secondary memory read address, (b) said provided secondary memory read address is outside of all of said secondary memory address ranges which are defined as noncacheable, and (c) caching is enabled;

generating a cache miss indication if the tag portion of none of the cache memory entries which map to the secondary memory data line containing the data bytes designated by the provided secondary memory read address, associates its entry with the secondary memory data line containing the data bytes designated by the provided secondary memory read address; and generating a cache miss indication also if said provided secondary memory read address is within one of said secondary memory address ranges which is defined as noncacheable; and returning data from said secondary memory instead of said cache memory in response to said cache miss indications, said method further comprising the step of invalidating said given cache memory entry if caching is disabled, by, if caching is disabled, writing into the tag portion of said given entry a tag which associates said entry with a secondary memory data line that is within one of said secondary memory address ranges which is defined as noncacheable, said step of invalidating said given cache memory entry eliminating a requirement for a tag-valid bit for each entry of said cache memory.

5. A method according to claim 4, wherein said computer system powers up with caching disabled.

6. A method for managing a cache memory having a plurality of entries, each entry having a tag portion and a data portion, for use with a secondary memory having storage for bytes of data at secondary memory addresses, said storage being organized into a plurality of secondary memory data lines, each of said secondary memory addresses designating at least one of the data bytes in one of said secondary memory data lines, said cache memory having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable, for use further in a computer system permitting enablement and disablement of caching, said method comprising the steps of:

flushing said cache memory by writing into the tag portion of each particular one of said cache memory entries a respective tag which associates said particular entry with a respective secondary memory data line that is within one of said secondary memory address ranges which is defined as noncacheable, said method further comprising the steps of, in response to a read access to a provided secondary memory read address, which read access occurs subsequently to said step of flushing:

returning data from the data portion of a given one of said cache memory entries, which entry maps to the secondary memory data line containing the data bytes designated by the provided secondary memory read address, only if (a) the tag portion of said given cache memory entry associates said given entry with the secondary memory data line containing the data bytes designated by the provided secondary memory read address, (b) said provided secondary memory read address is outside of all of said secondary memory address ranges which are defined as noncacheable, and (c) caching is enabled;

generating a cache miss indication if the tag portion of none of the cache memory entries which map to the secondary memory data line containing the data bytes designated by the provided secondary memory read address, associates its entry with the secondary memory data line containing the data bytes designated by the provided secondary memory read address; and generating a cache miss indication also if said provided secondary memory read address is within one of said secondary memory address ranges which is defined as noncacheable; and returning data from said secondary memory instead of said cache memory in response to said cache miss indications;

said step of flushing said cache memory entry eliminating a requirement for a tag-valid bit for each entry of said cache memory.

7. Cache memory control apparatus, for use with a cache memory having a plurality of entries, each entry having a tag portion and a data portion, for use further with a secondary memory having storage for bytes of data at secondary memory addresses, said storage being organized into a plurality of secondary memory data lines, each of said secondary memory addresses designating at least one of the data bytes in one of said secondary memory data lines, said cache memory having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable, said control apparatus comprising:

means for returning data from said secondary memory in response to a memory read request to a provided secondary memory read address, if said provided secondary memory read address is within one of said secondary memory address ranges which are defined as noncacheable;

means for returning data from the data portion of one of said cache memory entries in response to said provided secondary memory read address, only if said provided secondary memory read address is outside of all of said secondary memory address ranges which are defined as noncacheable; and means for invalidating a selected one of said cache memory entries by writing into the tag portion of said selected entry a first tag which associates said selected entry with a secondary memory data line that is within a first one of said secondary memory address ranges which is defined as noncacheable, said means for invalidating a selected one of said cache memory entries eliminating a requirement for a tag-valid bit from each entry of said cache memory.

8. Apparatus according to claim 7, for use further with a cache enablement signal indicating whether caching is enabled, wherein said means for returning data from the data portion of one of said cache memory entries, returns data only if caching is enabled.

9. Apparatus according to claim 7, wherein said mapping maps each of said secondary memory data lines to no more than one of said cache memory entries.

10. Apparatus according to claim 7, wherein said first secondary memory address range which is defined as noncacheable, is permanently noncacheable.

11. Apparatus according to claim 7, further comprising a writable memory defining whether said first secondary memory address range is noncacheable.

12. Apparatus according to claim 7, further comprising means for deriving said first tag from said provided secondary memory read address.

13. Cache memory control apparatus, for use with a cache memory having a plurality of entries, each entry having a tag portion and a data portion, for use further with a secondary memory having storage for bytes of data at secondary memory addresses, said storage being organized into a plurality of secondary memory data lines, each of said secondary memory addresses designating at least one of the data bytes in one of said secondary memory data lines, said cache memory having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable, for use further in a computer system permitting enablement and disablement of caching, said control apparatus comprising:

means for, in response to each read access to a provided secondary memory read address, returning data from the data portion of a given one of said cache memory entries, which entry maps to the secondary memory data line containing the data bytes designated by the provided secondary memory read address, only if (a) the tag portion of said given cache memory entry associates said given entry with the secondary memory data line containing the data bytes designated by the provided secondary memory read address, (b) said provided secondary memory read address is outside of all of said secondary memory address ranges which are defined as noncacheable, and (c) caching is enabled;

means for, in response to each of said read accesses, generating a cache miss indication if the tag portion of none of the cache memory entries which map to the secondary memory data line containing the data bytes designated by the provided secondary memory read address, associates its entry with the secondary memory data line containing the data bytes designated by the provided secondary memory read address;

means for, in response to each of said read accesses, generating a cache miss indication also if said provided secondary memory read address is within one of said secondary memory address ranges which is defined as noncacheable, means for returning data from said secondary memory instead of said cache memory in response to said cache miss indications; and invalidating means for, in response to each of said read accesses which occurs while caching is disabled, writing into the tag portion of said given entry a tag which associates said entry with a secondary memory data line that is within one of said secondary memory address ranges which is defined as noncacheable, said invalidating means eliminating a requirement for a tag-valid bit for each entry of said cache memory.

14. Apparatus according to claim 13, wherein said computer system powers up with caching disabled.

15. Cache memory control apparatus, for use with a cache memory having a plurality of entries, each entry having a tag portion and a data portion, for use further with a secondary memory having storage for bytes of data at secondary memory addresses, said storage being organized into a plurality of secondary memory data lines, each of said secondary memory addresses designating at least one of the data bytes in one of said secondary memory data lines, said cache memory having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable, said control apparatus comprising:

means for returning data from said secondary memory in response to a memory read request to a provided secondary memory read address, if said provided secondary memory read address is within one of said secondary memory address ranges which are defined as noncacheable;

means for returning data from the data portion of one of said cache memory entries in response to said provided secondary memory read address, only if said provided secondary memory read address is outside of all of said secondary memory address ranges which are defined as noncacheable; and cache flushing means for writing into the tag portion of each particular one of said cache memory entries a respective tag which associates said particular entry with a respective secondary memory data line that is within one of said secondary memory address ranges which is defined as noncacheable, said cache flushing means eliminating a requirement for a tag-valid bit for each entry of said cache memory.

16. Computer apparatus comprising:

a secondary memory having storage for bytes of data at secondary memory addresses, said storage being organized into a plurality of secondary memory data lines, each of said secondary memory addresses designating at least one of the data bytes in one of said secondary memory data lines;

a cache memory having a plurality of entries, each entry having a tag portion and a data portion, said computer apparatus having a mapping which maps each cache memory entry to a predetermined plurality of said secondary memory data lines, each cache memory entry being associated, according to a tag in its tag portion, with at most one of the secondary memory data lines to which the entry maps, at least one range of secondary memory addresses being defined as noncacheable;

means for returning data from said secondary memory in response to a memory read request to a provided secondary memory read address, if said provided secondary memory read address is within one of said secondary memory address ranges which are defined as noncacheable;

means for returning data from the data portion of one of said cache memory entries in response to said provided secondary memory read address, only if said provided secondary memory read address is outside of all of said secondary memory address ranges which are defined as noncacheable; and means for invalidating a selected one of said cache memory entries by writing into the tag portion of said selected entry a first tag which associates said selected entry with a secondary memory data line that is within a first one of said secondary memory address ranges which is defined as noncacheable, said means for invalidating a selected one of said cache memory entries eliminating a requirement for a tag-valid bit for each entry of said cache memory.

* * * * *